United States Patent
Heo et al.

(10) Patent No.: US 10,869,028 B2
(45) Date of Patent: Dec. 15, 2020

(54) OBJECT TRACKING METHOD AND APPARATUS AND THREE-DIMENSIONAL (3D) DISPLAY APPARATUS USING THE SAME

(71) Applicant: SAMSUNG ELECTRONICS CO., LTD., Suwon-si (KR)

(72) Inventors: Jingu Heo, Yongin-si (KR); Dong Kyung Nam, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 264 days.

(21) Appl. No.: 15/463,468

(22) Filed: Mar. 20, 2017

(65) Prior Publication Data
US 2018/0098057 A1 Apr. 5, 2018

(30) Foreign Application Priority Data
Oct. 5, 2016 (KR) .................. 10-2016-0128322

(51) Int. Cl.
| | |
|---|---|
| *H04N 13/383* | (2018.01) |
| *H04N 13/366* | (2018.01) |
| *G06T 7/33* | (2017.01) |
| *G06T 7/246* | (2017.01) |
| *G06K 9/00* | (2006.01) |
| *G06K 9/62* | (2006.01) |

(52) U.S. Cl.
CPC ......... *H04N 13/383* (2018.05); *G06K 9/0061* (2013.01); *G06K 9/6227* (2013.01); *G06T 7/248* (2017.01); *G06T 7/337* (2017.01); *H04N 13/366* (2018.05); *G06T 2207/20081* (2013.01); *G06T 2207/30201* (2013.01)

(58) Field of Classification Search
CPC combination set(s) only.
See application file for complete search history.

(56) References Cited

U.S. PATENT DOCUMENTS

| | | | |
|---|---|---|---|
| 7,736,005 B2 | 6/2010 | Saishu et al. | |
| 7,916,897 B2* | 3/2011 | Corcoran | G06K 9/00228 382/103 |
| 8,274,578 B2 | 9/2012 | Hong et al. | |
| 8,360,578 B2 | 1/2013 | Nummela | |

(Continued)

FOREIGN PATENT DOCUMENTS

| | | |
|---|---|---|
| EP | 2031544 B1 | 5/2011 |
| KR | 10-0756047 B1 | 9/2007 |

(Continued)

OTHER PUBLICATIONS

Timothy F. Cootes et al., "Active Appearance Models", IEEE Transactions on Pattern Analysis and Machine Intelligence, vol. 23, No. 6, Jun. 2001, (pp. 681-685).

(Continued)

*Primary Examiner* — Francis Geroleo
(74) *Attorney, Agent, or Firm* — Sughrue Mion, PLLC

(57) ABSTRACT

An object tracking method and apparatus based on object verification are provided. The object tracking method includes detecting a first area that corresponds to a target object in a current frame, aligning the target object with respect to the current frame, and tracking the target object in a next frame based on whether a second area corresponds to the target object as a result of the alignment.

16 Claims, 9 Drawing Sheets

(56) References Cited

U.S. PATENT DOCUMENTS

| | | |
|---|---|---|
| 8,944,600 B2 | 2/2015 | Blixt et al. |
| 2009/0304234 A1* | 12/2009 | Kondo .................... G06T 7/248 382/103 |
| 2011/0273571 A1* | 11/2011 | Shimada ............ G06K 9/00261 348/207.99 |
| 2012/0249524 A1* | 10/2012 | Yokote ................ H04N 13/359 345/419 |
| 2013/0058525 A1* | 3/2013 | Sugio ..................... G06T 7/248 382/103 |
| 2013/0314548 A1* | 11/2013 | Guan ................. H04N 5/23216 348/169 |
| 2015/0097925 A1 | 4/2015 | Choo et al. |
| 2016/0292533 A1* | 10/2016 | Uchiyama ............... G06T 7/593 |
| 2017/0053211 A1 | 2/2017 | Heo et al. |
| 2017/0098122 A1* | 4/2017 | el Kaliouby ........... A61B 5/744 |
| 2017/0134643 A1* | 5/2017 | Kim ........................ G06T 7/246 |
| 2017/0154423 A1 | 6/2017 | Heo et al. |
| 2017/0221272 A1* | 8/2017 | Li .......................... G06T 19/006 |
| 2017/0287446 A1* | 10/2017 | Young .................... G09G 5/391 |

FOREIGN PATENT DOCUMENTS

| | | |
|---|---|---|
| KR | 10-2011-0095314 A | 8/2011 |
| KR | 10-1439190 B1 | 9/2014 |
| KR | 10-1523765 B1 | 5/2015 |

OTHER PUBLICATIONS

Zhiwei Zhu et al., "Combining Kalman Filtering and Mean Shift for Real Time Eye Tracking Under Active IR Illumination", 2002 IEEE, (pp. 318-321).

Jiwei Hu et al., "An efficient two-stage framework for image annotation", Elsevier, Pattern Recognition 46 (2013), (pp. 936-947), journal homepage: www.elsevier.com/locate/prhttp://dx.doi.org/10.1016/j.patcog.2012.09.010.

Zhiwei Zhu et al., "Eye and gaze tracking for interactive graphic display", Machine Vision and Applications (2004), 15, (pp. 139-148), Digital Object Identifier (DOI) 10.1007/s00138-004-0139-4.

* cited by examiner

Input image

OBJECT TRACKING METHOD AND APPARATUS AND THREE-DIMENSIONAL (3D) DISPLAY APPARATUS USING THE SAME

CROSS-REFERENCE TO RELATED APPLICATION

This application claims priority from Korean Patent Application No. 10-2016-0128322, filed on Oct. 5, 2016, in the Korean Intellectual Property Office, the disclosure of which is incorporated herein by reference in its entirety.

BACKGROUND

1. Field

Methods and apparatuses consistent with exemplary embodiments relate to tracking an object and a three-dimensional (3D) display based on the tracked object.

2. Description of the Related Art

Generally, to track an object, an object may be detected from an image acquired by a camera, representative feature points of the object may be extracted, and coordinates of the object may be extracted for each frame based on the extracted feature points. For more comfortable viewing of a three-dimensional (3D) image, 3D coordinates of both eyes may be required. To acquire the 3D coordinates, two-dimensional (2D) information relating to the eyes, rotation information relating to a face, and an interpupillary distance may be used. The 3D coordinates may be extracted for each frame, and thus positions of the eyes may be tracked and a 3D image may be generated based on the positions of the eyes.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an object tracking method including detecting a first area that corresponds to a target object in a current frame, aligning the target object with respect to the current frame by extracting at least one feature point of the target object from within the first area, determining a second area used to track the target object based on the at least one feature point, and tracking the target object in a next frame based on whether the determined second area corresponds to the target object in the current frame.

The target object may be an object that includes eyes and a nose. Each of the first area and the second area may be defined based on a respective location and a respective size. The at least one feature point may include a pupil center.

The tracking of the target object may include, when the second area corresponds to the target object in the current frame, aligning the target object with respect to the next frame by extracting the at least one feature point of the target object from within the second area.

The tracking of the target object may further include, when the second area does not correspond to the target object in the current frame, detecting a third area that corresponds to the target object in the next frame, and aligning the target object with respect to the next frame by extracting the at least one feature point of the target object from within the third area.

The tracking of the target object may further include normalizing the second area in the current frame, and determining whether the normalized second area corresponds to the target object.

The tracking of the target object may include applying, to a first recognizer, a feature of a first complexity which is extracted from the second area in the current frame, applying, to a second recognizer, a feature of a second complexity which is extracted from the second area in the current frame, and determining whether the second area corresponds to the target object in the current frame based on an output of the first recognizer and an output of the second recognizer.

The determining of whether the second area corresponds to the target object in the current frame may include, when at least one from among the first recognizer and the second recognizer verifies that the second area corresponds to the target object in the current frame, determining that the second area corresponds to the target object in the current frame.

The detecting of the first area may include detecting the first area by using a detector that is trained based on error data. The error data may include at least one from among first error data detected when a classification of an object included in training data fails and second error data detected when the object in the training data is misclassified as a different object.

The aligning of the target object may include determining an image quality of the current frame, and aligning the target object by using an aligner that corresponds to the image quality from among a plurality of aligners which are trained for a corresponding plurality of image qualities.

According to another aspect of an example embodiment, there is provided an object tracking apparatus including at least one processor, and a memory including an instruction to be executed by the at least one processor. When the instruction is executed by the at least one processor, the at least one processor may be configured to detect a first area that corresponds to a target object in a current frame, to align the target object with respect to the current frame by extracting at least one feature point of the target object from within the first area, to determine a second area used to track the target object based on the at least one feature point, and to track the target object in a next frame based on whether the second area corresponds to the target object in the current frame.

When the second area corresponds to the target object in the current frame, the at least one processor may be further configured to align the target object with respect to the next frame by extracting the at least one feature point of the target object from within the second area.

When the second area does not correspond to the target object in the current frame, the at least one processor may be further configured to detect a third area that corresponds to the target object in the next frame, and to align the target object with respect to the next frame by extracting the at least one feature point of the target object from within the third area.

The at least one processor may be further configured to detect the first area in the current frame by using a detector that is trained based on error data. The error data may include at least one from among first error data detected when a classification of an object included in training data fails and second error data detected when the object included in the training data is misclassified as a different object.

The at least one processor may be further configured to determine an image quality of the current frame, and to align the target object by using an aligner that corresponds to the image quality from among a plurality of aligners trained for a corresponding plurality of image qualities.

According to another aspect of an example embodiment, there is provided a 3D display apparatus including an object tracking apparatus configured to track a target object based on an input image and to output eye position information of eyes of a user based on the target object, and a controller configured to generate a 3D image based on the eye position information, wherein the object tracking apparatus is further configured to detect a first area that corresponds to the target object in a current frame of the input image, to align the target object with respect to the current frame by extracting at least one feature point of the target object from within the first area, to determine a second area used to track the target object based on the at least one feature point, and to track the target object in a next frame based on whether the second area corresponds to the target object in the current frame.

When the second area corresponds to the target object in the current frame, the object tracking apparatus may be further configured to align the target object with respect to the next frame by extracting the at least one feature point of the target object from within the second area.

When the second area does not correspond to the target object in the current frame, the object tracking apparatus may be further configured to detect a third area that corresponds to the target object in the next frame, and to align the target object with respect to the next frame by extracting the at least one feature point of the target object from within the third area.

BRIEF DESCRIPTION OF THE DRAWINGS

The above and other aspects will become apparent and more readily appreciated from the following detailed description of certain example embodiments, taken in conjunction with the accompanying drawings of which.

DETAILED DESCRIPTION

Figure 1:
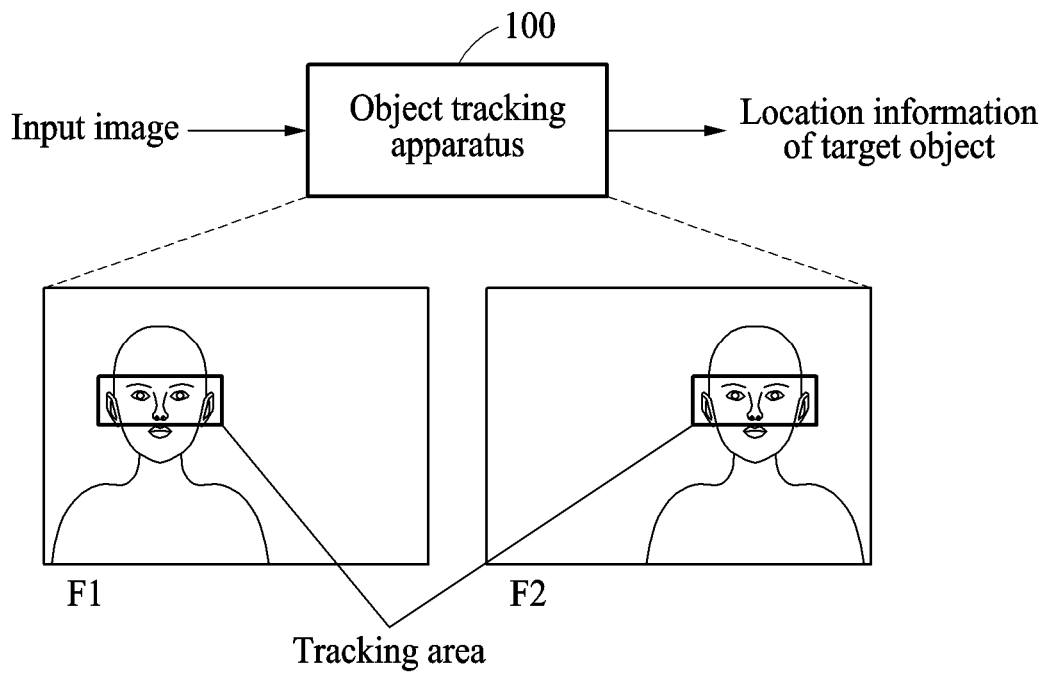
FIG. 1 is a block diagram illustrating an operation of an object tracking apparatus, according to an example embodiment.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although the terms "first" and/or "second" may be used to explain various components, the components are not limited to these terms. These terms are intended merely to distinguish one component from another component. For example, a "first" component may be referred to as a "second" component, or similarly, the "second" component may be referred to as the "first" component within the present scope, according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art, and are not to be construed as an ideal or excessively formal meaning unless otherwise defined herein.

Hereinafter, exemplary embodiments will be described in detail below with reference to the accompanying drawings, and like reference numerals refer to the like elements throughout the present specification.

FIG. 1 is a diagram illustrating an operation of an object tracking apparatus 100, according to an example embodiment. The object tracking apparatus 100 may be implemented by, for example, at least one software module, at least one hardware module, or various combinations thereof. Referring to FIG. 1, the object tracking apparatus 100 may receive an input image and may track a target object included in the input image.

The target object may refer to an object tracked by the object tracking apparatus 100. The target object may be, for example, an object that includes both eyes and a nose of a user. When a user moves, for example, trembles, it may be difficult to continue to track an entire face of the user. Accordingly, the object tracking apparatus 100 may perform more robustly with respect to a movement of the user by setting a target object to be a nose and eyes of the user, instead of the entire face of the user.

To track the target object, the object tracking apparatus 100 may detect a first area estimated to correspond to the target object in a current frame F1. Hereinafter, the first area may be referred to as a "detection area" and a location and a size of the detection area may be specified. According to example embodiments, a size of the detection area may be set in advance, and a location of the detection area may be determined by the object tracking apparatus 100.

The object tracking apparatus 100 may align the target object by extracting one or more feature points of the target object from the detection area in the current frame F1. For example, the object tracking apparatus 100 may extract feature points representing a shape of the target object from a portion of an image that corresponds to the detection area in the current frame F1, and may identify a geometric structure of the target object.

When the target object is aligned, the object tracking apparatus 100 may determine a second area used to track the target object based on the extracted feature points. Hereinafter, the second area may be referred to as a "tracking area." The object tracking apparatus 100 may determine, as a tracking area, an area that includes the feature points on a central portion of the area.

The object tracking apparatus 100 may verify whether the tracking area corresponds to the target object in the current frame F1, and may track the target object in a next frame F2 based on a verification result. For example, the object tracking apparatus 100 may verify whether the tracking area corresponds to the target object in the current frame F1 based on whether a portion of an image that corresponds to the tracking area includes the target object in the current frame F1.

In an example, when the tracking area corresponds to the target object in the current frame F1, the object tracking apparatus 100 may align the target object in the next frame F2 based on the tracking area. In another example, when the tracking area does not correspond to the target object in the current frame F1, the object tracking apparatus 100 may redetect the target object in the next frame F2.

The object tracking apparatus 100 may minimize the use of a detector during tracking of an object, which will be further described below. For example, when a user is out of a view of a camera or when both eyes of the user are covered, the object tracking apparatus 100 may use the detector. Due to the consumption of computing resources by a detecting operation of the detector, the use of the detector may be minimized. Because the detector scans all areas of an input image in order to detect the target object, a large amount of computing resources may be consumed to perform the detecting operation of the detector.

To realize a 3D image having a quality that is not degraded, the eyes of a user may need to be tracked at a frame rate (expressible in frames per second (FPS)) which is greater than or equal to a predetermined level. When a number of times the detector performs the detecting operation increases, an amount of computing resources to be consumed may increase, and the updating of eye position information about the eyes may be delayed. For example, when the updating of the eye position information fails at a required point in time during a display of a 3D image, a quality of the 3D image may be highly likely to be degraded. The object tracking apparatus 100 may minimize the use of the detector, in order to facilitate a timely update of the eye position information and to maintain a high quality of a 3D image.

The object tracking apparatus 100 may perform a verification operation to minimize the use of the detector. For example, the object tracking apparatus 100 may initially perform the detecting operation to secure the tracking area, and may continue to reuse the tracking area through a verification operation associated with the tracking area. The object tracking apparatus 100 may verify whether the tracking area corresponds to the target object through the verification operation, and may reperform the detecting operation when the tracking area does not correspond to the target object. The detecting operation may be performed once at a first time, and the tracking area may continue to be reused.

To continue to reuse the tracking area, increasing a probability that the target object is included in the tracking area may be important. To increase the probability that the target object is included in the tracking area, the object tracking apparatus 100 may enhance a degree of precision of an object detection, and the object tracking apparatus 100 may also enhance a degree of precision of an object alignment performed after the object detection. A detector that is trained based on error data may be used to enhance the degree of precision of the object detection, and aligners trained for each respective image quality may be used to enhance the degree of precision of the object alignment, which will be further described below.

The object tracking apparatus 100 may perform an object verification by using a recognizer. The recognizer may include a first recognizer and a second recognizer. The first recognizer may be trained based on first training data which includes training samples that correspond to various levels of difficulty, and the second recognizer may be trained based on second training data which includes training samples that correspond to relatively high levels of difficulty in comparison to the first training data. The tracking area may continue to be reused when the tracking area is determined to correspond to the target object, and thus a performance of the recognizer may have a great influence on an object tracking result. A recognition performance of the recognizer may be enhanced by using the first recognizer and the second recognizer. The training data for the first recognizer and the second recognizer may have different levels of difficulty. The recognizer will be further described below.

The object tracking apparatus 100 may output location information of the target object by tracking the target object included in the input image. The input image may include a plurality of frames. FIG. 1 illustrates a current frame F1 and a next frame F2 of the input image, however, there is no limitation thereto. For example, the input image may include a plurality of frames in addition to the current frame F1 and the next frame F2. The location information of the target object may include eye position information about eyes of a user. The object tracking apparatus 100 may track the target object in the plurality of frames included in the input image, and may output eye position information for each of the frames. The eye position information may include information about two-dimensional (2D) coordinates or 3D coordinates of positions of the eyes. The eye position information may be used to recognize positions of the eyes of a user in a glasses-free 3D display technology, or to recognize a position of an iris of a user in an iris recognition technology.

Figure 2:
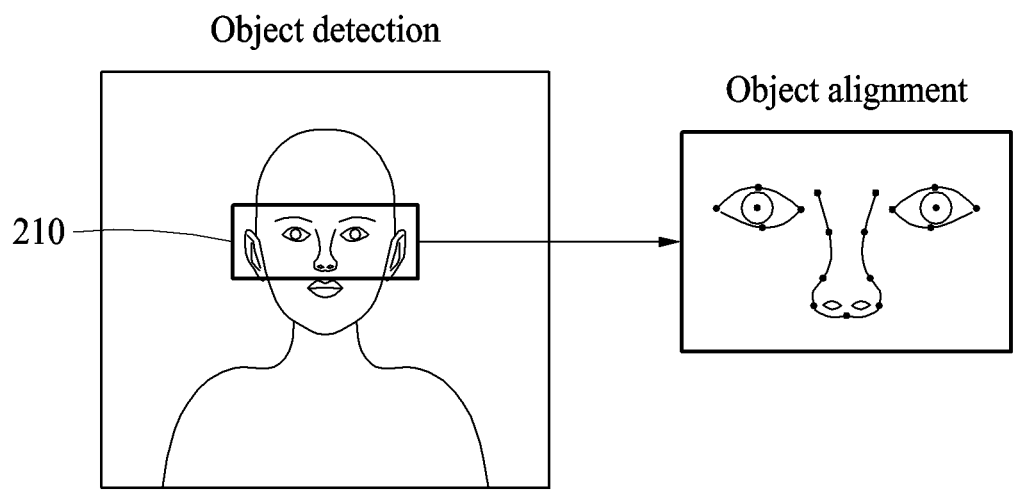
FIG. 2 is a diagram illustrating an object detection and an object alignment, according to an example embodiment.

FIG. 2 is a diagram illustrating an object detection and an object alignment, according to an example embodiment. An object tracking apparatus may detect a detection area 210 estimated to correspond to a target object in an input image. A detector may be implemented by, for example, at least one software module, at least one hardware module, or various combinations thereof.

The object tracking apparatus may detect the detection area 210 by using a detector that is trained in advance. To enhance a detection performance, the detector may be trained based on error data. A process of training the detector will be further described below. The detector may detect the detection area 210 by using a Haar-based adaptive boosting (AdaBoost) scheme and/or a local binary pattern (LBP)-based AdaBoost scheme.

The detector may output location information of the detection area 210 in the input image. The location information of the detection area 210 may include x- and y-coordinates of a reference point, and a width and a height of the detection area 210.

The object tracking apparatus may align the target object in the detection area 210. The object alignment may refer to a scheme of extracting one or more feature points of an object detected in an input image in order to represent a shape of the object by using lines or points. The object tracking apparatus may align the target object by using an aligner that is trained in advance. The aligner may be implemented by, for example, at least one software module, at least one hardware module, or various combinations thereof. The aligner may align the target object by extracting feature points of the target object. To enhance an alignment performance, the aligner may be trained for each image quality from among a plurality of image qualities. A process of training the aligner will be further described below.

Referring to FIG. 2, the feature points may be distributed on and around eyes and a nose of a user. The feature points may include, for example, a pupil center. To enhance a tracking performance, extracting pupil centers as feature points may be helpful, by comparison with searching for pupil centers from the eyes of a user detected by using the detector. The object tracking apparatus may output the eye position information based on feature points representing pupil centers.

Figure 3:
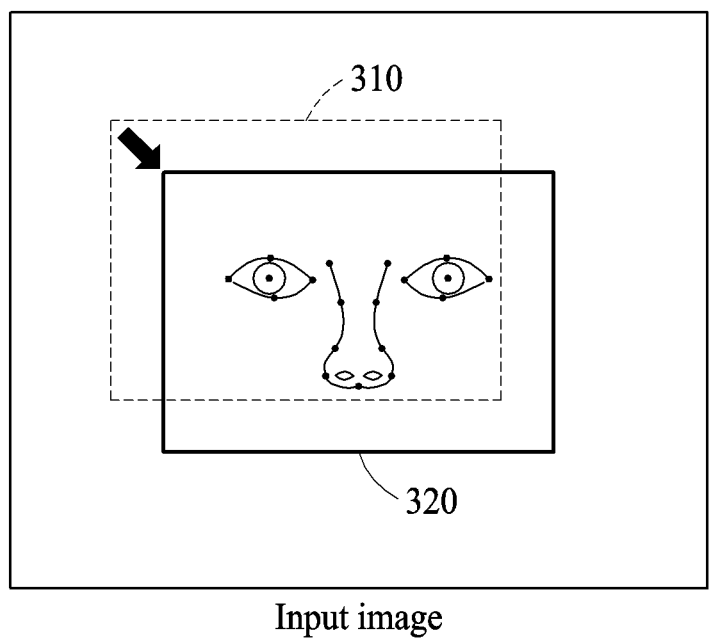
FIG. 3 is a diagram illustrating a detection area and a tracking area, according to an example embodiment.

FIG. 3 is a diagram illustrating a detection area 310 and a tracking area 320, according to an example embodiment. When the detection area 310 is determined by using a detector, an object tracking apparatus may determine the tracking area 320. The object tracking apparatus may output location information of the tracking area 320. The location information of the tracking area 320 may include x- and y-coordinates of a reference point, and a width and a height of the tracking area 320.

The object tracking apparatus may determine the tracking area 320 so that one or more feature points may be located in a central portion of the tracking area 320. When a plurality of feature points are present, the object tracking apparatus may determine the tracking area 320 based on a rectangular area that includes all of the plurality of feature points. The rectangular area may have a minimum size (i.e., a minimally sized rectangle such that all feature points are included). For example, the object tracking apparatus may determine, as the tracking area 320, an area that includes the rectangular area in a central portion of the area. Also, a size of the tracking area 320 may be determined in advance. In an example, the size of the tracking area 320 may be determined based on an average arrangement of eyes and noses of a plurality of users. In another example, the size of the tracking area 320 may be determined based on a size of the rectangular area. Also, a width and a height of the tracking area 320 may be determined to be twice a width and a height of the rectangular area.

When the tracking area 320 is determined to correspond to the target object, the tracking area 320 may be reused to track the target object in a next frame. Because the target object is located near the central portion of the tracking area 320 in a current frame, a probability that the target object is located in the tracking area 320 in the next frame may be relatively high. Thus, the target object may continue to be located in the tracking area 320 while the tracking area 320 is slightly moved. The object tracking apparatus may continue to track the target object based on the tracking area 320 instead of additionally detecting all areas of the input image.

Figure 4:
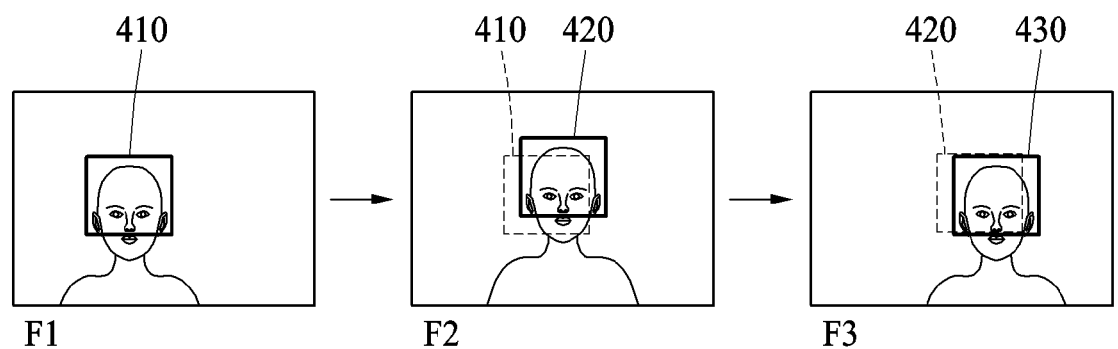
FIG. 4 is a diagram illustrating a tracking process in an example in which a tracking area corresponds to a target object, according to an example embodiment.

FIG. 4 is a diagram illustrating a tracking process in an example in which a tracking area corresponds to a target object, according to an example embodiment. FIG. 4 illustrates frames F1, F2 and F3 among a plurality of frames of an input image. An object tracking apparatus may detect a detection area in the frame F1, and may determine a tracking area 410 based on feature points of the target object extracted from within the detection area. Because the tracking area 410 in the frame F1 includes a nose and eyes of a user, the object tracking apparatus may determine that the tracking area 410 corresponds to the target object through a verification process. The object tracking apparatus may track the target object based on the tracking area 410 in a next frame, that is, the frame F2. Because the tracking area 410 corresponds to the target object, the object tracking apparatus may not need to detect the target object in the frame F2.

A target object in the frame F2 may be located further upward and further rightward in comparison to the location of the target object in the frame F1. The object tracking apparatus may extract feature points of the target object from the tracking area 410 in the frame F2. The object tracking apparatus may determine a new tracking area 420 in the frame F2 based on the feature points extracted from the tracking area 410. For example, the object tracking apparatus may determine, as the tracking area 420, an area that includes the extracted feature points in a central portion of the area. Because the tracking area 420 in the frame F2 includes a nose and eyes of a user, the object tracking apparatus may determine that the tracking area 420 corresponds to the target object through a verification process. The object tracking apparatus may continue to track the target object based on the tracking area 420 in a next frame, that is, the frame F3.

Similarly to the frame F2, in the frame F3, feature points of the target object may be extracted from the tracking area 420, and a new tracking area 430 may be determined. As described above, when a tracking area is determined to correspond to a target object, the object tracking apparatus may track the target object instead of additionally detecting an object.

Figure 5:
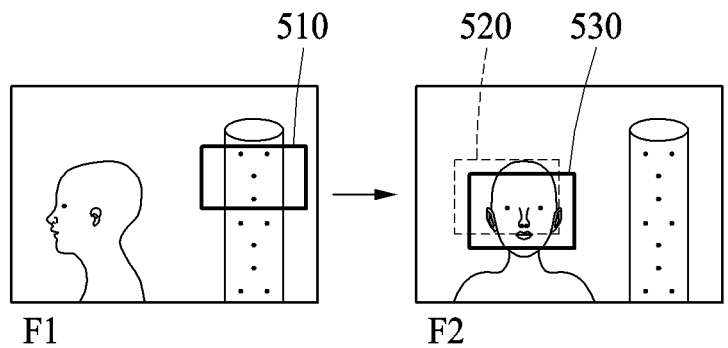
FIG. 5 is a diagram illustrating a tracking process in an example in which a tracking area does not correspond to a target object, according to an example embodiment.

FIG. 5 is a diagram illustrating a tracking process in an example in which a tracking area does not correspond to a target object, according to an example embodiment. FIG. 5 illustrates frames F1 and F2 among a plurality of frames of an input image. An object tracking apparatus may determine a tracking area 510 in the frame F1. In the frame F1, the tracking area 510 may not correspond to eyes and a nose of a user. Accordingly, the object tracking apparatus may determine that the tracking area 510 does not correspond to a target object through a verification process.

Because the tracking area 510 does not correspond to the target object in the frame F1, the object tracking apparatus may redetect a detection area 520 that corresponds to the target object in the frame F2. The object tracking apparatus may extract feature points of the target object from within the detection area 520, and may determine a tracking area 530 based on the extracted feature points.

Figure 6:
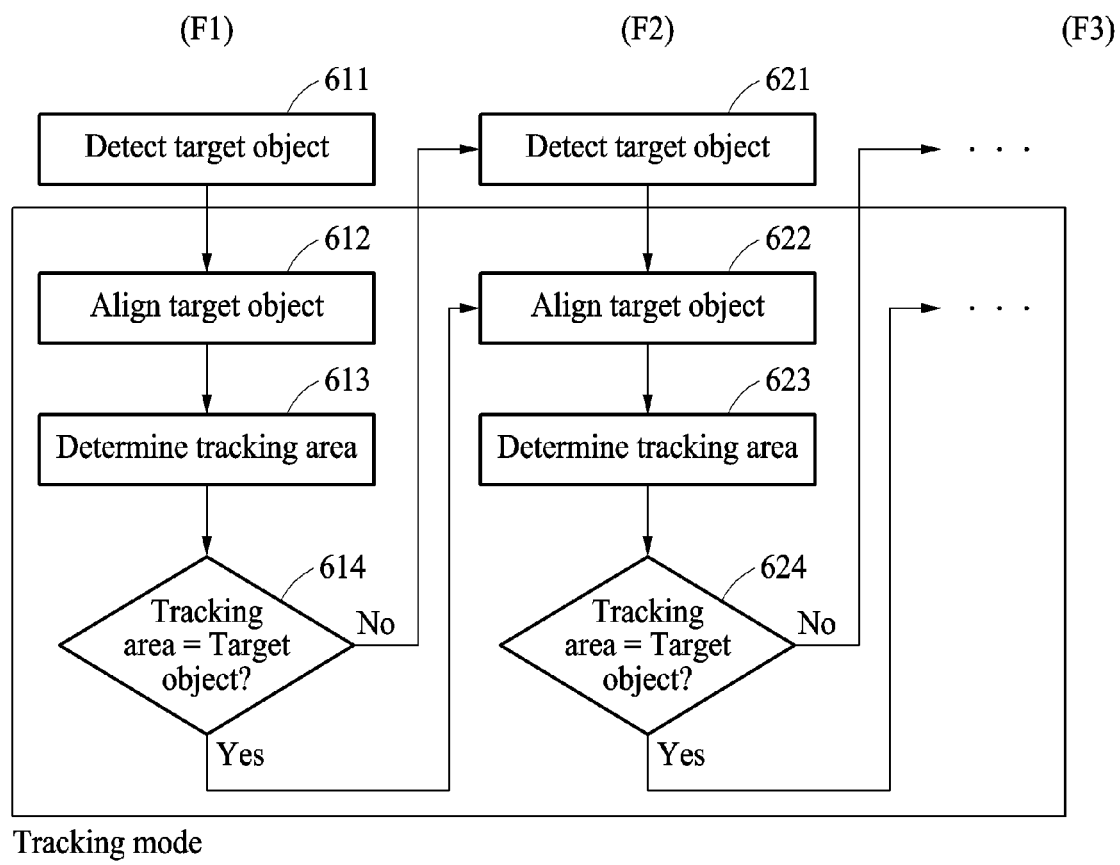
FIG. 6 is a flowchart illustrating an object tracking process, according to an example embodiment.

FIG. 6 is a flowchart illustrating an object tracking process, according to an example embodiment. FIG. 6 illustrates examples of object tracking processes associated with a plurality of frames, for example, frames F1, F2 and F3, of an input image. Operations 611, 612, 613 and 614 may be performed in order to track an object in the frame F1.

In operation 611, an object tracking apparatus may detect a detection area estimated to correspond to a target object from the frame F1. Also, in operation 611, the object tracking apparatus may output location information of the detection area. In operation 612, the object tracking apparatus may align the detected target object. In operation 612, the object tracking apparatus may extract feature points of the target object and may output the extracted feature points. In operation 613, the object tracking apparatus may determine a tracking area based on the extracted feature points. In operation 613, the object tracking apparatus may output location information of the tracking area. In operation 614, the object tracking apparatus may determine whether the tracking area corresponds to the target object. For example, prior to operation 614, the object tracking apparatus may normalize the tracking area by using an affine warping scheme. In this example, in operation 614, the object tracking apparatus may determine whether the normalized tracking area corresponds to the target object. When the tracking area is determined to correspond to the target object, operation 622 may be performed. When the tracking area is determined not to correspond to the target object, operation 621 may be performed.

Operations 621, 622, 623 and 624 may be performed in order to track an object in the frame F2. In operation 621, the object tracking apparatus may detect the target object in the frame F2. When the tracking area does not correspond to the target object in the frame F1, the object tracking apparatus may redetect the target object in operation 621. When the tracking area corresponds to the target object in the frame F1, operation 621 may not be performed. In operation 622, the object tracking apparatus may align the target object. When the tracking area does not correspond to the target object in the frame F1, the object tracking apparatus may align the target object. When the tracking area corresponds to the target object in the frame F1, the object tracking apparatus may align the target object based on the tracking area determined in operation 613. In operation 623, the object tracking apparatus may determine a tracking area based on feature points that are extracted as a result of alignment of the target object. In operation 624, the object tracking apparatus may determine whether the tracking area corresponds to the target object. Based on whether the tracking area corresponds to the target object, the object tracking apparatus may align the target object in the frame F3 based on the tracking area determined in operation 623, or may redetect the target object in the frame F3. The description of operations 611 through 614 for the frame F1 may also be applicable to operations 621 through 624 for the frame F2.

For convenience of description, the description of the frames F1 and F2 may also be applicable to the frame F3 and frames subsequent to the frame F3, and accordingly is not repeated here. A mode in which object tracking, as opposed to object detection, continues to be performed may be referred to a "tracking mode." The object tracking apparatus may continuously maintain the tracking mode, and thus it is possible to minimize a consumption of computing resources for object tracking, and it is also possible to update eye position information of a user at an appropriate time.

Figure 7:
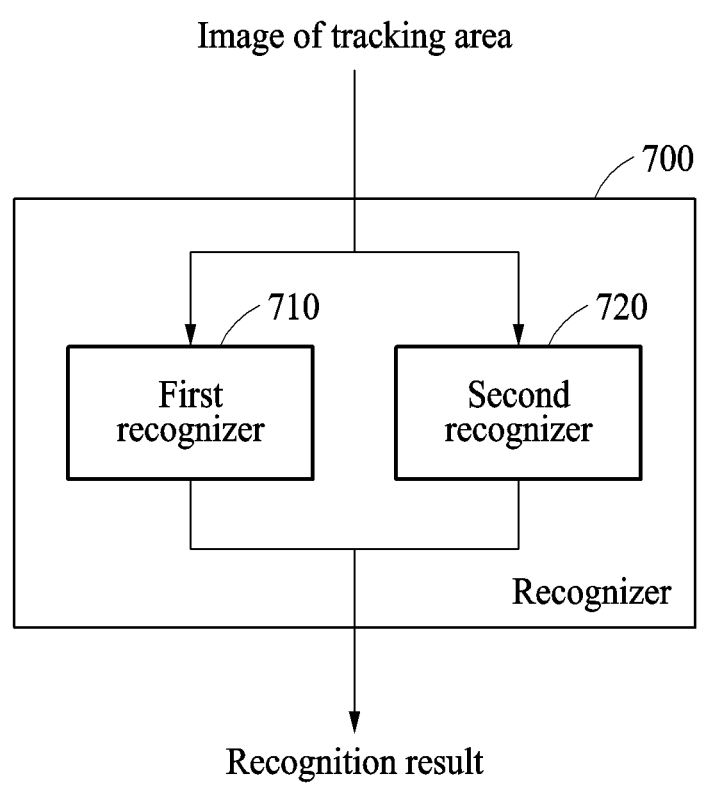
FIG. 7 is a block diagram illustrating a recognizer for an object verification, according to an example embodiment.

FIG. 7 is a block diagram illustrating a recognizer 700 which is usable for performing an object verification, according to an example embodiment. Referring to FIG. 7, the recognizer 700 includes a first recognizer 710 and a second recognizer 720. The recognizer 700 may receive an image of a tracking area and may determine whether the tracking area corresponds to a target object. Each of the recognizer 700, the first recognizer 710 and the second recognizer 720 may be implemented by, for example, at least one software module, at least one hardware module, or various combinations thereof. The image of the tracking area may be normalized and the normalized image may be input to the recognizer 700. An operation of determining whether the tracking area corresponds to the target object may be referred to as "object verification." The recognizer 700 may output a verification result obtained by the object verification.

Because the tracking area continues to be reused when the tracking area is determined to correspond to the target object as described above, a performance of the recognizer 700 may have a great influence on an object tracking result. Thus, the recognizer 700 may enhance a recognition performance by using the first recognizer 710 and the second recognizer 720. Training data for training the first recognizer 710 and the second recognizer 720 may have different respective levels of difficulty. The first recognizer 710 may be trained based on first training data which includes training samples that correspond to various levels of difficulty, and the second recognizer 720 may be trained based on second training data which includes training samples that correspond to relatively high levels of difficulty, which will be further described below. When at least one from among the first recognizer 710 and the second recognizer 720 recognizes that the tracking area corresponds to the target object, the recognizer 700 may determine that the tracking area corresponds to the target object. Thus, an accuracy of the verification result may be enhanced by combining advantages of the first recognizer 710 with advantages of the second recognizer 720.

Figure 8:
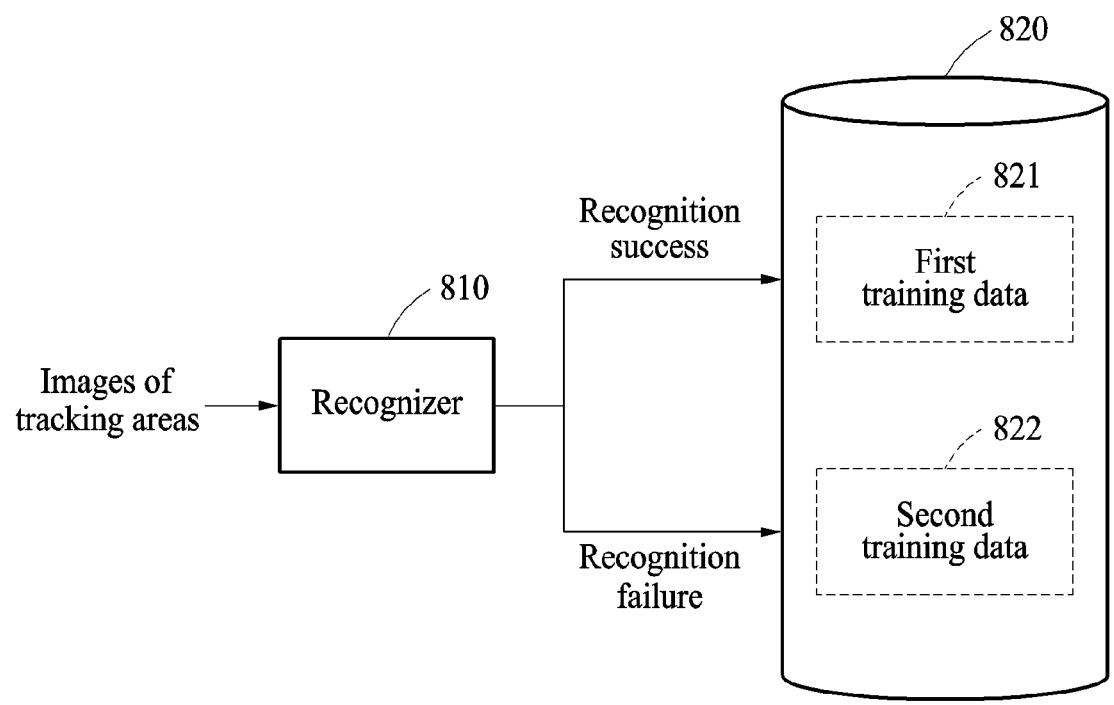
FIG. 8 is a diagram illustrating a training database (DB) for training of a recognizer, according to an example embodiment.

FIG. 8 is a diagram illustrating a training database (DB) 820 for training of a recognizer 810, according to an example embodiment. Referring to FIG. 8, the recognizer 810 may output a recognition result based on an image of a tracking area. The recognizer 810 may be trained in advance to recognize a target object in the image of the tracking area. The training DB 820 may be configured based on the recognition result of the recognizer 810. For example, an image recognized by the recognizer 810 among images of tracking areas may be classified as first training data 821, and an image that is not recognized by the recognizer 810 among the images of the tracking areas may be classified as second training data 822. The expression "not recognized by the recognizer 810" may encompass failing to recognize a target object included in the image of the tracking area and incorrectly recognizing another object included in the image of the tracking area as the target object. The set of images that are not recognized by the recognizer 810 may include, for example, an image with a low illumination, a motion blur image (i.e., an image that appears blurry due to motion of an object), and an image in which a portion of a target object is cropped.

Based on a classifying operation that is performed by using the recognizer 810, the first training data 821 may include training samples with a recognition complexity that corresponds to a normal level of difficulty, and the second training data 822 may include training samples with a recognition complexity that corresponds to a relatively high level of difficulty. Training data which includes training samples that correspond to various levels of difficulty may be formed based on the first training data 821 and the second training data 822, and training data which includes training samples that correspond to relatively high levels of difficulty may be formed based on the second training data 822. The above-described first recognizer and the above-described second recognizer may be trained based on the training data which includes the training samples with various levels of difficulty, and the training data which includes the training samples with relatively high levels of difficulty, respectively.

Figure 9:
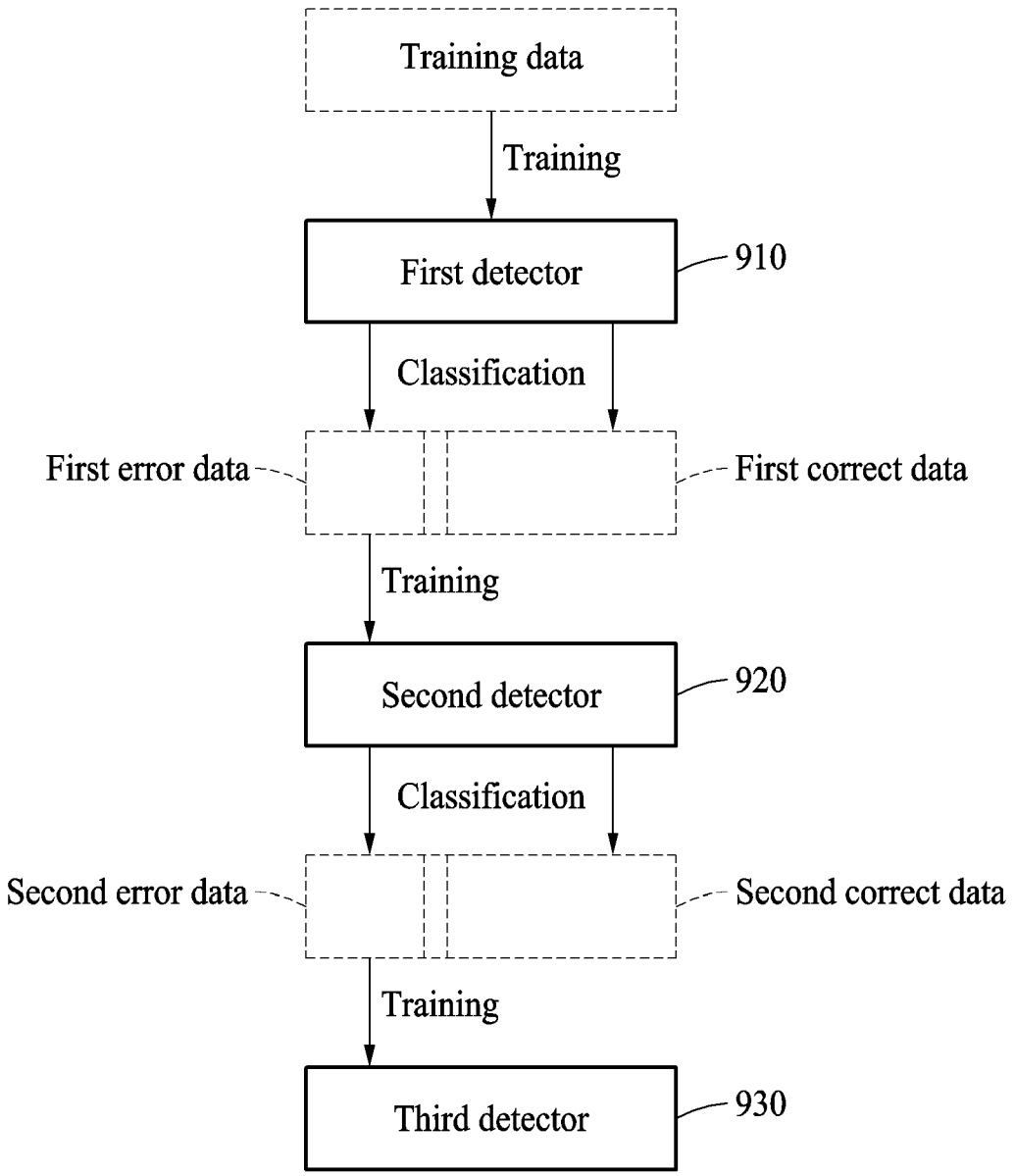
FIG. 9 is a diagram illustrating a process of training a detector based on error data, according to an exemplary embodiment.

FIG. 9 is a diagram illustrating a process of training a detector based on error data, according to an example embodiment. Referring to FIG. 9, a first detector 910 may be trained based on training data. When the first detector 910 is trained based on training data, the first detector 910 may classify the training data into first error data and first correct data. The training data may include a target object to be trained. Correct data may refer to data obtained when a target object is successfully detected by a detector, from among the training data. Error data may refer to data obtained when the target object is not detected by the detector, from among the training data. The expression "not detected" may encompass a failure in detection of a target object included in the training data and an incorrect detection of another object included in the training data as the target object.

A second detector 920 may be trained based on the first error data. Because error data corresponds to a relatively high level of detection difficulty, a detector trained based on the error data may be highly likely to classify a target object in an input image that has a relatively high level of detection difficulty. When the second detector 920 is trained based on the first error data, the second detector 920 may classify training data into second error data and second correct data. A third detector 930 may be trained based on the second error data. A level of difficulty of error data may increase when a stage goes up. For example, a level of difficulty of the second error data may be higher than a level of difficulty of the first error data. Thus, the third detector 930, which is trained based on the second error data, may have an excellent detection performance in comparison to the second detector 920, which is trained based on the first error data.

When stages are repeated until a detector that has a predetermined performance level is acquired, a final detector may be determined. For example, when the third detector 930 has a predetermined performance level, the third detector 930 may be determined as a final detector. In this example, an object tracking apparatus may detect a detection area that corresponds to a target object in an input image by using the third detector 930. As described above, in order to continue to reuse a tracking area, increasing a probability that a target object is included in the tracking area may be important. In order to enhance a degree of precision of an object detection, the object tracking apparatus may use the third detector 930 to detect the detection area that corresponds to the target object in the input image. For convenience of description, three stages have been described above, however, there is no limitation thereto. Accordingly, a number of stages may be adjusted based on a desired performance level. For example, when a detector with a desired performance level is acquired at a fourth stage, the detector may be used as a final detector.

Figure 10:
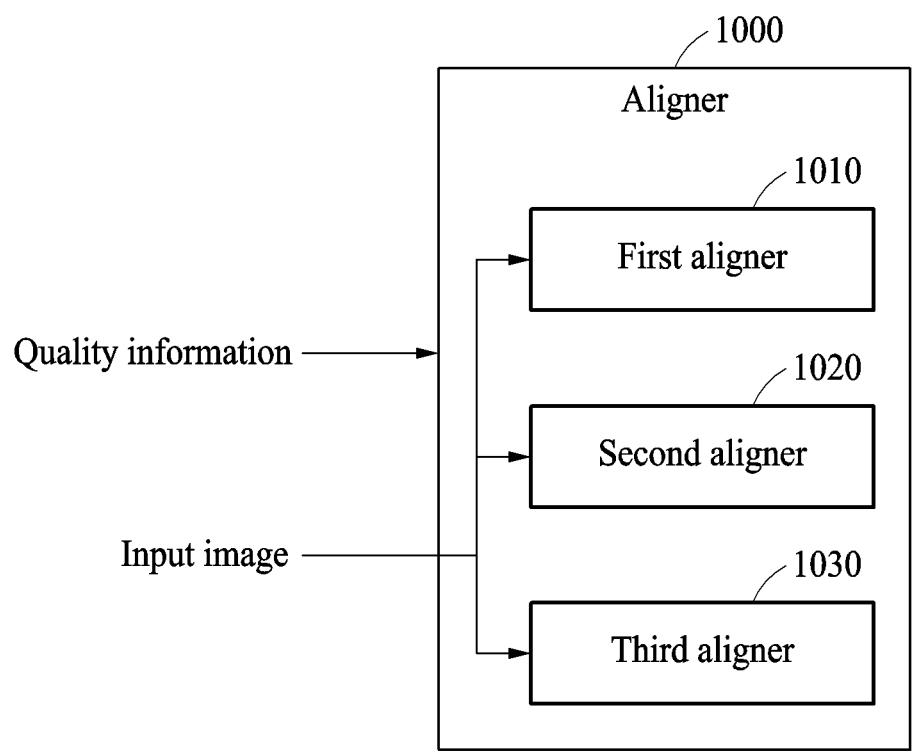
FIG. 10 is a block diagram illustrating an aligner trained for each image quality, according to an exemplary embodiment.

FIG. 10 is a block diagram illustrating an aligner 1000 trained for each image quality from among a plurality of image qualities, according to an example embodiment. Referring to FIG. 10, the aligner 1000 includes three sub-aligners, for example, a first aligner 1010, a second aligner 1020, and a third aligner 1030. For convenience of description, the aligner 1000 includes the three sub-aligners, however, there is no limitation thereto. For example, the aligner 1000 may include at least two or four sub-aligners. Sub-aligners may be trained based on images with different respective qualities. For example, the first aligner 1010 may be trained based on a high quality image, the second aligner 1020 may trained based on a medium quality image, and the third aligner 1030 may trained based on a low quality image.

An object tracking apparatus may determine a quality of an input image, and may input the input image and quality information about the quality of the input image to the aligner 1000. The aligner 1000 may select a sub-aligner that corresponds to the quality information from among the plurality of sub-aligners, and may provide the input image to the selected sub-aligner. For example, when the input image has a high quality, the aligner 1000 may provide the input image to the first aligner 1010, which is trained based on a high quality image. When the input image is received, the selected sub-aligner may align a target object in the input image. In an example, the object tracking apparatus may provide location information of a detection area together with the input image to the aligner 1000. In another example, the object tracking apparatus may input, to the aligner 1000, a portion of the input image that corresponds to the detection area, instead of inputting all portions of the input image. The selected sub-aligner may align the target object in the detection area based on information received by the aligner 1000.

The object tracking apparatus may include a quality classifier configured to determine a quality of an input image. The quality classifier may include a plurality of sub-classifiers. A quality classifier that includes a first classifier, a second classifier, and a third classifier will be described below, however, there is no limitation thereto. For example, the quality classifier may include a single sub-classifier, the quality classifier may include two sub-classifiers, or the quality classifier may include at least four sub-classifiers. Each of the first classifier, the second classifier, and the third classifier may receive a respective input image, and may output quality information of the respective input image. Each of the first classifier, the second classifier, and the third classifier may be trained based on a single quality, and may generate quality information that corresponds to the quality. For example, the first classifier may be trained based on a high quality image, may detect the high quality image in the input image and may align an object included in the high quality image.

The first classifier may be trained based on a training sample in which high quality images are classified as a positive class and medium quality images and low quality images are classified as a negative class. The second classifier may be trained based on a training sample in which medium quality images are classified as a positive class and high quality images and low quality images are classified as a negative class. Also, the third classifier may be trained based on a training sample in which low quality images are classified as a positive class and high quality images and medium quality images are classified as a negative class.

For example, a high quality image may be detected by the first classifier, a medium quality image may be detected by the second classifier, and a low quality image may be detected by the third classifier. Input images may be sequentially or simultaneously input to the first classifier, the second classifier and the third classifier. When the first classifier detects a high quality image among input images, quality information that corresponds to a high quality may be generated. When the second classifier detects a medium quality image among input images, quality information that corresponds to a medium quality may be generated. When the third classifier detects a low quality image among input images, quality information that corresponds to a low quality may be generated.

The object tracking apparatus may determine a quality of an input image by using a classifier that includes the above-described sub-classifiers. Also, the object tracking apparatus may align a target object in the input image by using the aligner 1000 that is trained for each respective image quality from among a plurality of image qualities. As described above, in order to continue to reuse a tracking area, increasing a probability that a target object is included in the tracking area may be important. Thus, the object tracking apparatus may enhance a degree of precision of an object alignment by using the aligner 1000.

Figure 11:
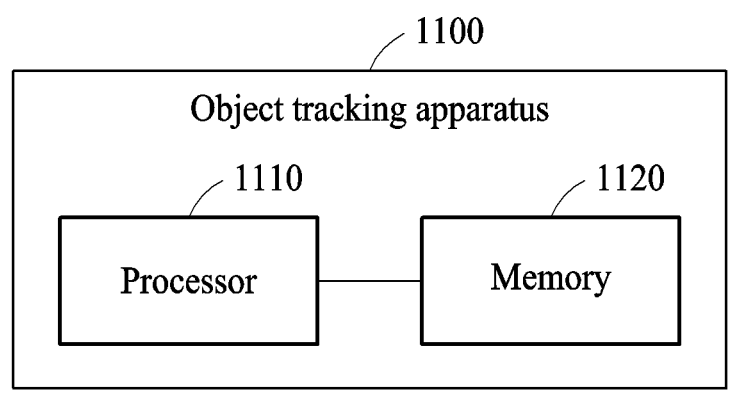
FIG. 11 is a block diagram illustrating an object tracking apparatus, according to an exemplary embodiment.

FIG. 11 is a block diagram illustrating an object tracking apparatus 1100, according to an example embodiment. Referring to FIG. 11, the object tracking apparatus 1100 includes a processor 1110 and a memory 1120. The memory 1120 may include, for example, a nonvolatile memory such as a hard disk drive (HDD), a solid state drive (SSD) or a flash memory, or a volatile memory such as a dynamic random access memory (DRAM). The memory 1120 may include a computer-readable instruction. The instruction may be used to perform the above-described operations. For example, when the instruction is executed by the processor 1110, the processor 1110 may detect a detection area estimated as a target object in a current frame, may align the target object by extracting one or more feature points of the target object, may determine a tracking area used to track the target object based on the extracted feature points, and may align or redetect the target object in a next frame based on whether the tracking area corresponds to the target object. The above description is also applicable to the object tracking apparatus 1100, and accordingly is not repeated here.

Figure 12:
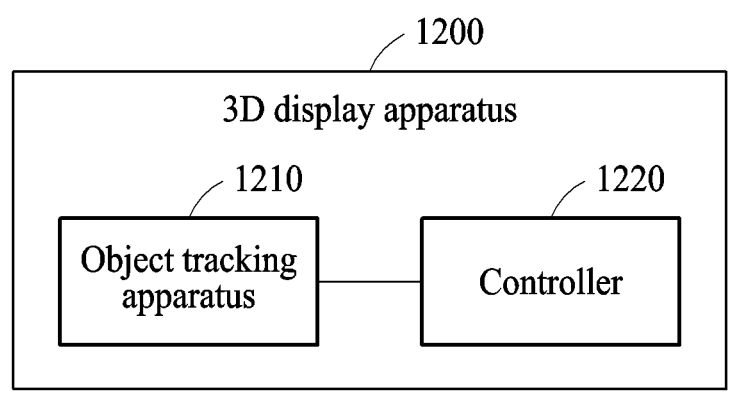
FIG. 12 is a block diagram illustrating a 3D display apparatus, according to an exemplary embodiment.

FIG. 12 is a block diagram illustrating a 3D display apparatus 1200, according to an example embodiment. Referring to FIG. 12, the 3D display apparatus 1200 includes an object tracking apparatus 1210 and a controller 1220. The 3D display apparatus 1200 may be installed in, for example, any of a mobile device, a monitor, a television (TV) or a head-up display (HUD), and may be configured to provide a 3D image to a user. The object tracking apparatus 1210 may track a target object based on an input image and may output eye position information of eyes of a user based on the target object. For example, the object tracking apparatus 1210 may detect a detection area estimated as a target object in a current frame of an input image, may align the target object by extracting one or more feature points of the target object, may determine a tracking area used to track the target object based on the extracted feature points, and may align the target object in a next frame of the input image based on the tracking area or redetect the target object in the next frame, based on whether the tracking area corresponds to the target object. The above description is also applicable to the object tracking apparatus 1210, and accordingly is not repeated here. The controller 1220 may generate a 3D image based on the eye position information. The controller 1220 may generate a 3D image that corresponds to a viewpoint of a user by using a known scheme.

Figure 13:
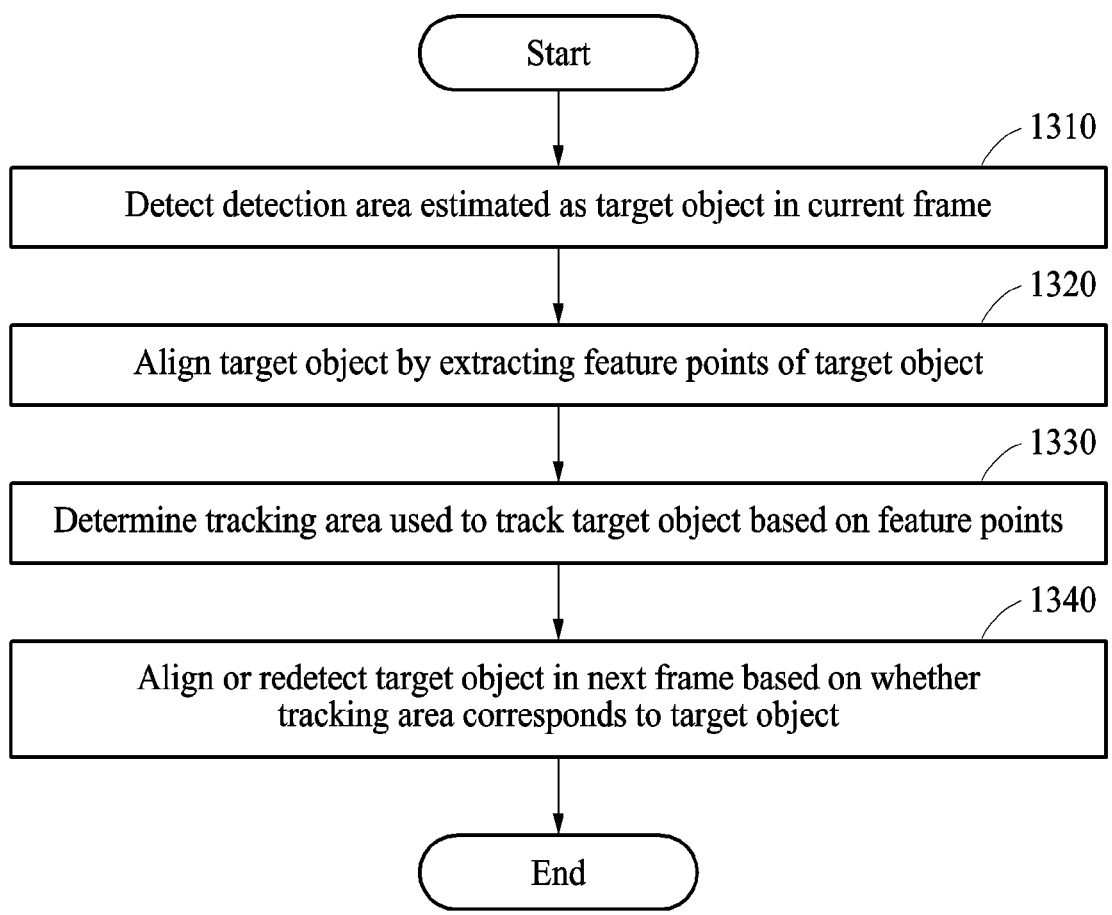
FIG. 13 is a flowchart illustrating an object tracking method, according to an exemplary embodiment.

FIG. 13 is a flowchart illustrating an object tracking method, according to an example embodiment. Referring to FIG. 13, in operation 1310, an object tracking apparatus detects a detection area estimated as a target object in a current frame. In operation 1320, the object tracking apparatus aligns the target object by extracting one or more feature points of the target object. In operation 1330, the object tracking apparatus determines a tracking area used to track the target object based on the extracted feature points. In operation 1340, the object tracking apparatus aligns or redetects the target object in a next frame based on whether the tracking area corresponds to the target object. The above description is also applicable to the object tracking method, and accordingly is not repeated here.

The example embodiments described herein may be implemented by using hardware components, software components, or a combination thereof. A processing device may be implemented by using one or more general-purpose or special purpose computers, such as, for example, any of a processor, a controller and an arithmetic logic unit, a digital signal processor, a microcomputer, a field programmable array, a programmable logic unit, a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, in order to independently or collectively instruct or configure the processing device to operate as desired. Software and data may be embodied permanently or temporarily in any type of machine, component, physical or virtual equipment, computer storage medium or device, or in a propagated signal wave that is capable of providing instructions or data to the processing device, or that is capable of being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media which include program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as compact disk-read-only memory (CD ROM) disks and digital versatile disks (DVDs); magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other examples embodiments. Suitable results may be achieved if the described techniques are performed in a different order, and/or if components in a described system, architecture, device, or circuit are combined in a different manner and/or replaced or supplemented by other components or their equivalents. Therefore, the scope of the present disclosure is defined not by the detailed description, but by the claims and their equivalents, and all variations within the scope of the claims and their equivalents are to be construed as being included in the present disclosure.

What is claimed is:

1. An eye tracking method comprising:
obtaining a first frame of an input image;
detecting a first detecting area that corresponds to a target object in the first frame, the target object comprising eyes;
aligning the target object with respect to the first frame by extracting a first set of at least one feature point of the target object from within the first detecting area, wherein the first set of the at least one feature point comprises a pupil center of the eyes;
determining a tracking area based on a position of the first set of the at least one feature point, the tracking area comprising the first set of the at least one feature point;
obtaining a second frame of the input image, the second frame corresponding to a next frame of the first frame;
when the tracking area corresponds to the target object in the second frame, aligning the target object with respect to the second frame by extracting a second set of at least one feature point of the target object from within an area in the second frame corresponding to the tracking area without redetecting the target object in the second frame, wherein the second set of the at least one feature point comprises the pupil center of the eyes; and
updating the tracking area by adjusting a position of the tracking area so that the second set of the at least one feature point is located at a central portion of the tracking area based on a position of the second set of the at least one feature point, the updated tracking area comprising the second set of the at least one feature point.

2. The eye tracking method of claim 1, wherein the target object is an object that further comprises a nose.

3. The eye tracking method of claim 1, wherein each of the first detecting area and the tracking area is defined based on a respective location and a respective size.

4. The eye tracking method of claim 1, further comprising:
when the tracking area does not correspond to the target object in the second frame,
detecting a second detecting area that corresponds to the target object in the second frame; and
aligning the target object with respect to the second frame by extracting the second set of the at least one feature point of the target object from within the second detecting area of the second frame.

5. The eye tracking method of claim 1, further comprising:
normalizing the tracking area in the first frame; and
determining whether the normalized tracking area corresponds to the target object in the second frame.

6. The eye tracking method of claim 1, further comprising:
applying, to a first recognizer, a first feature of a first complexity which is extracted from the area in the second frame;
applying, to a second recognizer, a second feature of a second complexity which is extracted from the area in the second frame; and
determining whether the tracking area corresponds to the target object in the second frame based on an output of the first recognizer and an output of the second recognizer.

7. The eye tracking method of claim 6, wherein the determining whether the tracking area corresponds to the target object in the second frame comprises: when at least one from among the first recognizer and the second recognizer verifies that the tracking area corresponds to the target object in the second frame, determining that the tracking area corresponds to the target object in the second frame.

8. The eye tracking method of claim 1, wherein the detecting the first detecting area comprises detecting the first detecting area by using a detector that is trained based on error data, and
wherein the error data comprises at least one from among first error data detected when a classification of an object included in training data fails and second error data detected when the object included in the training data is misclassified as a different object.

9. The eye tracking method of claim 1, wherein the aligning the target object with respect to the first frame comprises:
determining an image quality of the first frame; and
aligning the target object by using an aligner that corresponds to the image quality from among a plurality of aligners which are trained for a corresponding plurality of image qualities.

10. A non-transitory computer-readable storage medium storing a program for causing a processor to perform the method of claim 1.

11. An eye tracking apparatus comprising:
at least one processor; and
a memory comprising an instruction to be executed by the at least one processor,
wherein, when the instruction is executed by the at least one processor, the at least one processor is configured to:
obtain a first frame of an input image;
detect a first detecting area that corresponds to a target object in the first frame, the target object comprising eyes,
align the target object with respect to the first frame by extracting a first set of at least one feature point of the target object from within the first detecting area, wherein the first set of the at least one feature point comprises a pupil center of the eyes,
determine a tracking area based on a position of the first set of the at least one feature point, the tracking area comprising the first set of the at least one feature point,
obtain a second frame of the input image, the second frame corresponding to a next frame of the first frame,
when the tracking area corresponds to the target object in the second frame, align the target object with respect to the second frame by extracting a second set of at least one feature point of the target object from within an area in the second frame corresponding to the tracking area without redetecting the target object in the second frame, wherein the second set of the at least one feature point comprises the pupil center of the eyes, and update the tracking area by adjusting a position of the tracking area so that the second set of the at least one feature point is located at a central portion of the tracking area based on a position of the second set of the at least one feature point, the updated tracking area comprising the second set of the at least one feature point.

12. The eye tracking apparatus of claim 11, wherein, when the tracking area does not correspond to the target object in the second frame, the at least one processor is further configured to detect a second detecting area that corresponds to the target object in the second frame, and to align the target object with respect to the second frame by extracting the second set of the at least one feature point of the target object from within the second detecting area of the second frame.

13. The eye tracking apparatus of claim 11, wherein the at least one processor is further configured to detect the first detecting area by using a detector that is trained based on error data, and wherein the error data comprises at least one from among first error data detected when a classification of an object included in training data fails and second error data detected when the object included in the training data is misclassified as a different object.

14. The eye tracking apparatus of claim 11, wherein the at least one processor is further configured to determine an image quality of the first frame, and to align the target object by using an aligner that corresponds to the image quality from among a plurality of aligners trained for a corresponding plurality of image qualities.

15. A three-dimensional (3D) display apparatus comprising:

an eye tracking apparatus configured to track a target object based on an input image and to output eye position information of eyes of a user based on the target object, the target object comprising eyes; and a controller configured to generate a 3D image based on the eye position information, wherein the eye tracking apparatus is further configured to:

obtain a first frame of the input image;

detect a first detecting area that corresponds to the target object in the first frame of the input image, align the target object with respect to the first frame by extracting a first set of at least one feature point of the target object from within the first detecting area, wherein the first set of the at least one feature point comprises a pupil center of the eyes, determine a tracking area based on a position of the first set of the at least one feature point, the tracking area comprising the first set of the at least one feature point, obtain a second frame of the input image, the second frame corresponding to a next frame of the first frame, when the tracking area corresponds to the target object in the second frame, align the target object with respect to the second frame by extracting a second set of at least one feature point of the target object from within an area in the second frame corresponding to the tracking area without redetecting the target object in the second frame, wherein the second set of the at least one feature point comprises the pupil center of the eyes, and update the tracking area by adjusting a position of the tracking area so that the second set of the at least one feature point is located at a central portion of the tracking area based on a position of the second set of the at least one feature point, the updated tracking area comprising the second set of the at least one feature point.

16. The 3D display apparatus of claim 15, wherein when the tracking area does not correspond to the target object in the second frame, the eye tracking apparatus is further configured to detect a second detecting area that corresponds to the target object in the second frame, and to align the target object with respect to the second frame by extracting the second set of the at least one feature point of the target object from within the second detecting area of the second frame.

* * * * *